Nov. 18, 1941.    J. M. FLUKE    2,263,294
WELDING MACHINE
Filed July 9, 1940
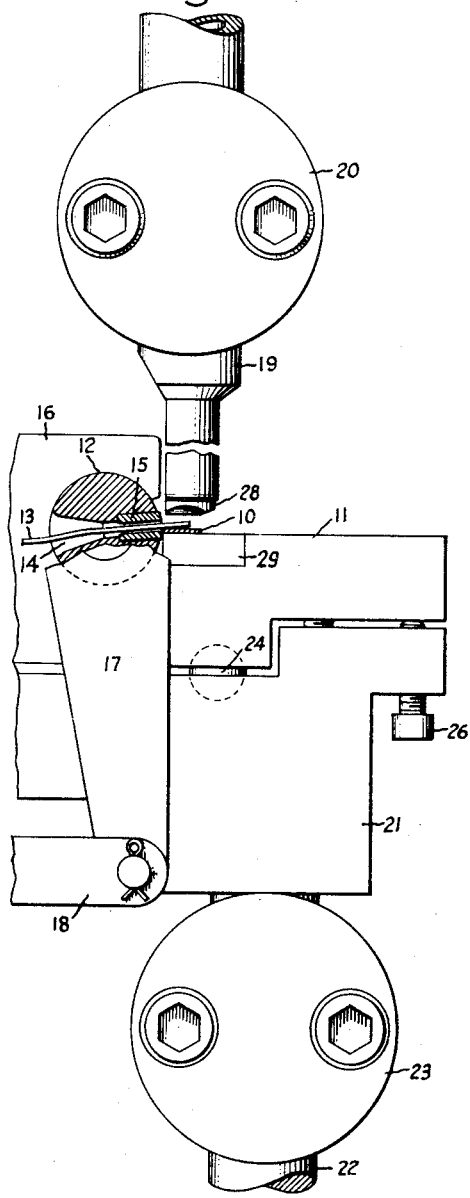
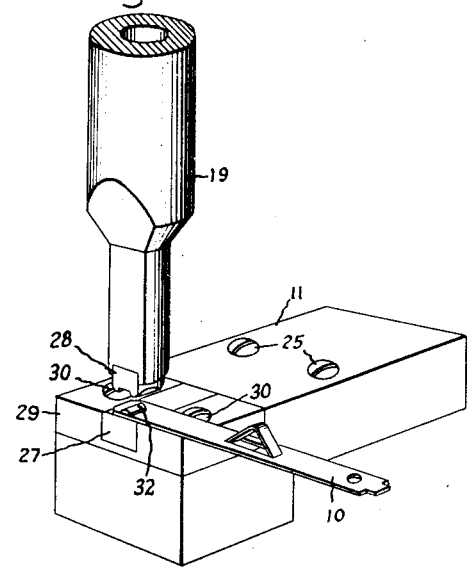
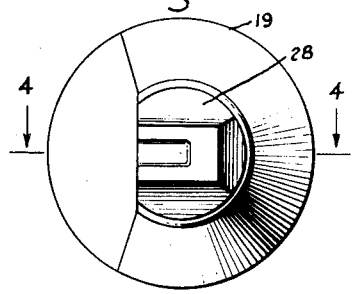
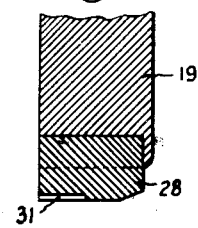
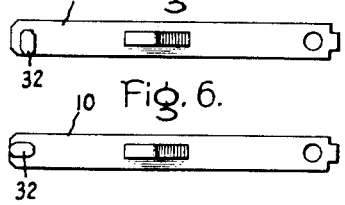
Inventor:
John M. Fluke,
by Harry E. Dunham
His Attorney.

Patented Nov. 18, 1941

2,263,294

UNITED STATES PATENT OFFICE 2,263,294

WELDING MACHINE

John M. Fluke, Bridgeport, Conn., assignor to General Electric Company, a corporation of New York Application July 9, 1940, Serial No. 344,534

6 Claims. (Cl. 219—4)

My invention relates to a resistance welding machine that may be used for performing welding, brazing or soldering operations. It is particularly suited for applying my method of manufacturing switch contacts, which method forms the subject matter of my application Serial No. 344,533, filed concurrently herewith and assigned to the same assignee as my present invention. The contacts as part of a switch assembly form the subject matter of my application Serial No. 380,739, filed February 26, 1941, which is a division of my application Serial No. 344,533.

In accordance with the method disclosed in my above referred to application, a wire of contact material is attached to a switch member by positioning a predetermined length thereof across a surface of said switch member and then simultaneously shaping and attaching it to said switch member by the simultaneous application of pressure and electric current thereto. The wire stock is then severed at one edge of the switch member to complete the manufacturing operation. The resulting contact comprises a strip of contact material having a molded surface portion and a flattened base portion, both of which are bounded by a thin round edge portion of the contact except at one end where the contact is cut even with the edge of the switch member to which it has been directly attached by an integral union of its base portion with the surface of the switch member.

It is an object of my invention to provide apparatus particularly suited for performing the above operations in the manufacture of a contact such as above described.

It is a further object of my invention to provide apparatus embodying a pair of electrodes one of which is provided with an edge which cooperates with the edge of another member for severing an article extending therebetween after the tip portion of said article has been attached through the agency of said electrodes to another article.

It is also an object of my invention to provide a support for an electrode by means of which its work engaging surface may be tilted and held in a predetermined position relative to the contact surface of a cooperating electrode.

Further objects of my invention will become apparent from a consideration of the following description of one embodiment thereof which is illustrated in the accompanying drawing, in which Fig. 1 is a front view of the electrodes and their support as well as the cutting mechanism associated therewith; Fig. 2 is a perspective view illustrating the construction of the electrodes; Figs. 3 and 4 are detail views illustrating the cavity formed in the tip portion of one of the electrodes; and Figs. 5 and 6 are illustrations of pairs of switch contacts that have been made by employing the apparatus illustrated in the other figures of the drawing.

In the automatic welding machine partially illustrated in the drawing, a switch member 10 is positioned on an electrode 11 by placing its side in engagement with the periphery of a cylinder 12 whose side wall is located closely adjacent the edge portion of this electrode. A predetermined length of contact material 13 is fed through a transverse opening 14 in this cylinder across the edge portion of switch member 10. This transverse passageway is formed in part by a hardened bushing 15 which is inserted in the opening in cylinder 12. The end of this bushing and the juxtaposed edges of switch member 10 and electrode 11 form the cutting edges or blades of a shear by means of which the predetermined length of contact material is severed from the remainder of the wire when cylinder 12 is rotated in its supporting block 16 by the operation of an arm 17 attached to this cylinder. This arm 17 is connected by a link 18 to an operating mechanism (not shown).

The above referred to predetermined length of contact material 13 is simultaneously molded and bonded to the surface of switch member 10 by means of electric current and pressure supplied through electrodes 11 and 19. Electrode 19 is clamped in the upper arm 20 of a welding machine and electrode 11 is supported on a member 21 which is provided with a rod 22 which is clamped in the lower arm 23 of the welding machine. Pressure and current are supplied to the electrodes through arms 20 and 23 of the welding machine.

In order to bring the work engaging surfaces of electrodes 19 and 11 into parallelism, electrode 11 is supported on and adjusted about a bronze ball 24 which is located in oppositely disposed ball sockets in electrode 11 and its support member 21. Current is supplied from support member 21 through this ball to electrode 11. It will be noted that this ball and socket support is at the cutting edge end of the electrode which is located opposite cutting cylinder 12. The means for adjusting electrode 11 relative to its support 21 is provided at its other end and comprises three screws 25 and 26. Screws 25 pass through electrode 11 into support member 21 attaching it thereto, and screw 26 passes through a flange portion of member 21 to engage the outer end of electrode 11. The relative adjustment of these screws will tilt electrode 11 about its ball and socket support and thus make it possible to bring its contact surface into any desired position relative to the contact surface of the cooperating electrode 19.

Electrodes 11 and 19 are provided with inserts of tungsten 27 and 28. Tungsten insert 27 is brazed in a groove in a block 29 which is attached by screws 30 to and forms a component part of electrode 11. It will be noted that the top and end surfaces of tungsten insert 27 are flush with the corresponding surfaces of electrode 11. The exposed edge of tungsten insert 27 also constitutes in the arrangement illustrated a support for backing up the adjacent edge of the switch member with which it cooperates in forming a cutting edge. Tungsten insert 28 of electrode 19 is located and brazed in a recess in the tip portion of this electrode. As shown in Figs. 3 and 4, the work engaging surface of insert 28 is provided with a work confining cavity 31 which extends through a side wall thereof which is aligned with the cutting edge of electrode 11. It will be noted that this side wall is formed by cutting away a portion of electrode 19 to provide space for block 16 which supports cutting cylinder 12. In the arrangement illustrated, block 16 is opposite the cutting edge portion of electrode 11 and is attached to and insulated from support member 21.

In the automatic machine partially illustrated in the drawing, means are provided for predetermining the following sequence of operations: feeding a predetermined length of contact material 13 through cylinder 12, applying pressure and electric current thereto by closing electrodes 11 and 19 on said predetermined length of contact material and the switch member 10 located therebetween, interrupting the flow of current while maintaining electrode engagement with the contact material and switch member, cutting the strip of contact material by moving the cutting surfaces of cylinder 12 and electrode 11 relative to one another to shear this material, and then separating the electrodes to release the resulting assembly. This assembly, as shown in Figs. 2, 5 and 6, comprises switch member 10 having a flattened strip of molded contact material 32 attached thereto.

During the bonding and forming operations used in manufacturing such switch contacts, the strip of contact material 13 if formed of silver wire or like material, becomes plastic and at its bonding surface with the switch member 10 is at least partly fluid. There is, consequently, a marked tendency for the silver to blow out from beneath electrode 19 which engages it and applies pressure and current thereto. I have found that if the cavity 31 in the work engaging surface of electrode 19 is of substantially the same length as the predetermined length of silver wire and has a volume slightly less than this predetermined length of silver wire it is possible to impart the desired surface configuration to contact 32 while at the same time preventing any of the silver from being blown away while it is being bonded to switch member 10. For example, when bonding pure silver wire (99.9% or more silver) having a diameter of .055 inch, the cavity 31 may have a depth of .016 inch and a width at the tip of the electrode of .115 inch. The length of the groove may be .200 inch. The contact 32 formed when using a wire and cavity of these dimensions will be .200 inch long, .115 inch wide, and have a maximum thickness of .020 inch. The switch member 10 may be formed of a strip of phosphor bronze .025 inch in thickness and .250 inch in width.

This dimensioning of cavity 31 in electrode 19 makes certain that the predetermined length of contact material within it when rendered soft and plastic by the flow of electric current will be shaped to the contour of the cavity and that a small amount of the contact material will be forced out around the edges of the cavity and between the end of the electrode and the switch member to which the contact is being attached. This insures the maintenance of sufficient pressure on the strip of contact material to prevent arcing at the electrodes and make certain that the upper electrode will never come into contact with the material to which the silver is being bonded. The bonding of the silver contact with the switch member over the entire surface of contact between them is further facilitated by having the opposed work engaging surfaces of the electrodes nearly parallel so that equal pressure and thus uniform density of electric current will flow over the entire contact. A convenient arrangement of parts for providing this adjustment is the ball and socket support of electrode 11 above described.

Tungsten inserts 27 and 28 of electrodes 11 and 19 are employed to increase the heating effect of the electric current flowing through these electrodes and the work parts inserted therebetween. In addition to the resistance effect of these inserts, there is an additional resistance effect resulting from the limited area of engagement between the round wire 13 of contact material, the flattened concave surface of the cavity 31 and the flat surface of the switch member 10. These combined resistance effects soften the predetermined length of contact material so that it is molded to the configuration of cavity 31 in electrode 19 and the surface of the switch member 10 to which it is at the same time united by a joint that may be characterized as a weld or as a brazed union.

Although a particular embodiment of my invention has been described above, it will be understood that modifications and variations may be made without departing from the spirit and scope thereof. I, therefore, aim by the appended claims to cover all such modifications and variations as fall within the spirit and scope of my invention.

What I claim as new and desire to secure by Letters Patent of the United States is:

1. Electrical apparatus comprising cooperating electrodes one of which is provided with a work supporting and cutting edge, a member having a cutting edge opposed to the cutting edge of said electrode, and means for moving said member relatively to said cooperating electrodes to bring the cutting edges of said member and said one electrode into engagement with work located between said cooperating electrodes.

2. Electrical apparatus comprising electrodes the work engaging surface of one of which is provided with a work supporting and cutting edge and the work engaging surface of the other of which is provided with a work confining cavity which extends through a side wall thereof which is aligned with said cutting edge, a member having a cutting edge opposed to the cutting edge of said electrode, and means for moving said member and said electrode relative to one another to move said cutting edges across one another.

3. Electrical apparatus for attaching predetermined lengths of contact material to switch members comprising an electrode having a work supporting and cutting edge, a member having a cutting edge opposed to the said edge of said electrode, means for moving said electrode and said member relative to one another to move their cutting edges across one another, means for directing a predetermined length of contact material between said cutting edges across said electrode, a cooperating electrode having in its tip portion a cavity which extends through a side wall thereof whose edge at said tip portion is aligned with the cutting edge of said first-mentioned electrode, said cavity having a length substantially the same as said predetermined length of contact material and a volume slightly less than the volume of said predetermined length of contact material, and means for supplying pressure and electric current to said electrodes.

4. Electrical apparatus for attaching predetermined lengths of contact material to switch members comprising an electrode having a cutting edge, a cylinder whose side wall is closely adjacent the cutting edge of said electrode and constitutes a stop for positioning an edge of a switch member even with the cutting edge of said electrode, means including a transverse opening in said cylinder for directing said predetermined length of contact material across a switch member positioned by said cylinder relatively to said electrode, and means for rotating said cylinder to move the end of said opening across the cutting edge said electrode to shear said predetermined length of contact material from the remainder thereof which extends through said opening.

5. Electrical apparatus for attaching predetermined lengths of contact material to switch members comprising an electrode having a cutting edge, a cylinder whose side wall is closely adjacent the cutting edge of said electrode and constitutes a stop for positioning an edge of a switch member even with the cutting edge of said electrode, means including a transverse opening in said cylinder for directing said predetermined length of contact material across a switch member positioned by said cylinder relative to said electrode, a cooperating electrode having in its tip portion a cavity which extends through a side wall thereof whose edge at said tip portion is aligned with the cutting edge of said first-mentioned electrode, said cavity having a length substantially the same as said predetermined length of contact material and a volume slightly less than the volume of said predetermined length of contact material, and means for rotating said cylinder to move the end of said opening across the cutting edge of said electrode to shear said predetermined length of contact material from the remainder thereof which extends through said opening.

6. Electrical apparatus comprising an electrode having at one end a cutting edge, a support member spaced from said electrode at its cutting end by a ball located therebetween in oppositely disposed ball sockets formed in said support member and said electrode, means at the other end of said electrode for pressing it and said support member into engagement with said ball and for tilting said electrode relative to said support member about said ball, a member having a cutting edge opposed to the cutting edge of said electrode, and means for moving said member and said electrode relative to one another to move said cutting edges across one another.

JOHN M. FLUKE.